United States Patent [19]

Pflueger et al.

[11] Patent Number: 5,222,130
[45] Date of Patent: Jun. 22, 1993

[54] MESSAGE ARRANGEMENT AND METHOD FOR IMPLEMENTING A DIGITAL TELEPHONE SYSTEM

[75] Inventors: Michael W. Pflueger, Glendale, Ariz.; Mark S. Dailey, Novato, Calif.; David A. Slobodianuk; Joseph M. Molling, both of Phoenix, Ariz.

[73] Assignee: AG Communication Systems Corporation, Phoenix, Ariz.

[21] Appl. No.: 615,523

[22] Filed: Nov. 19, 1990

[51] Int. Cl.⁵ ............................................. H04M 7/00
[52] U.S. Cl. ................................... 379/399; 379/231; 379/225; 379/219; 379/229
[58] Field of Search ............... 379/398, 399, 219, 220, 379/225, 227, 228, 229, 230, 231, 232

[56] References Cited

U.S. PATENT DOCUMENTS

| | | | |
|---|---|---|---|
| 3,920,912 | 11/1975 | Anderson et al. | 379/231 |
| 4,090,034 | 5/1978 | Moylan | 379/231 |
| 4,492,321 | 4/1984 | Stehman | 379/225 |
| 4,499,336 | 2/1985 | Krikor et al. | 379/230 |
| 4,661,974 | 4/1987 | Bales et al. | 379/225 |
| 5,042,062 | 8/1991 | Lee et al. | 379/219 |
| 5,046,088 | 9/1991 | Margulies | 379/231 |
| 5,086,461 | 2/1992 | Thorn et al. | 379/230 |
| 5,103,449 | 4/1992 | Jolissaint | 379/231 |

Primary Examiner—James L. Dwyer
Assistant Examiner—M. Shehata
Attorney, Agent, or Firm—Anthony J. Baca

[57] ABSTRACT

A message arrangement and method for interfacing a digital telephone Digital system including a Digital Facility Line Card (DFLC) that connects a user operated Telephone Instrument (DTI) to a stored program operated digital Central Office (CO) system. The message arrangement comprises, a DFLC message processor that generates and transmits to the DTI control messages in response to report messages transmitted by the DTI, following a user activated DTI event. The control messages provide the user with visual and aural DTI operating information. The DFLC message processor further generates and transmits to a CO system central controller, device report messages requesting access to, and network services from the CO system, responsive to call processing report messages from the DTI. The CO system central controller sends device control messages to the DFLC which operates in accordance with the received device control messages to generate and transmit to the DTI, DTI control messages. The DTI control messages instruct the DTI to provide the user with operating information and to collect call processing data from the DTI, for transmission to the DFLC message processor. The DFLC message processor translates the call processing data and generates device report messages, which are transmitted to the CO system.

5 Claims, 10 Drawing Sheets

MESSAGE ARRANGEMENT AND METHOD FOR IMPLEMENTING A DIGITAL TELEPHONE SYSTEM

CROSS-REFERENCE TO RELATED APPLICATIONS

Cross-reference is made to related U.S. patent applications titled: "A Digital Phone System," Ser. No. 07/615,528 filed on Nov. 19, 1990; "A Circuit for Testing Digital Lines," Ser. No. 07/615,529 filed on Nov. 19, 1990; and "An Arrangement And Method Of Downloading Data To A Plurality Of Destinations In A Digital Telephone System," Ser. No. 07/615,522 filed on Nov. 19, 1990, all filed on the same date and by the same assignee as the present Application.

BACKGROUND OF THE INVENTION

1. Field of the Invention

The present invention relates in general to telecommunication systems, and more particularly, to an arrangement and method of proprietary control protocol and messages that are used in the functional operation of a digital telephone system.

2. Description of the Prior Art

Prior to the present invention, remote telephone consoles were implemented as described in U.S. Pat. No. 4,751,696, "CENTREX ATTENDANT CONSOLE INTERFACE". But this implementation was limited because:

1. It required a total of six wires between the Central Office (CO) and the console;
2. The analog signal is not digitized until reaching the CO, thereby allowing noise to be induced;
3. The line card (CONI) does not provide any call processing functions;
4. The data channel is limited to a low BAUD rate; and
5. All customer information is stored in the central office's central computer or the remote console.

Most organizations desire each secretary to have a telephone instrument console for answering unattended phones, determining who is using the phone, intercepting calls, etc. These features are generally present if the organization purchases a Private Branch Exchange (PBX); however, as stated in U.S. Pat. No. 4,751,696, the telephone industry developed CENTREX to provide many of the same features without the initial capital or maintenance requirements. But, because of the limitation stated above, the number of consoles per CO was limited.

Because of the limited number of consoles, the telecommunications industry developed its CENTREX features to function on a standard telephone instrument. This was accomplished by using "access" codes to indicate which feature was to be used. Each feature generally required a distinct access code.

To simplify the features, and reduce the number of access codes that must be memorized, a programmable telephone instrument was developed. The programmable telephone instrument had feature buttons that sent the appropriate access code to the CENTREX system. But to answer an unattended telephone instrument a secretary must either forward the call from the unattended telephone to their console or be able to hear the unattended telephone ring and press the correct access code (or feature button). To solve this problem, each line to be monitored was split and sent to both the telephone and the secretarial console. When a telephone rings (or is busy) the secretarial console indicates which line is ringing. But, the number of wires connected to the console can quickly become prohibitive.

Presently known implementations of programmable telephones load the operational and functional software into the instrument itself. The "Intelligent" digital telephone communicated or passed control and operational messages directly to the host system central processor complex. Since modern CO exchanges operate in real time, software processing of such real time requests for operational service from a plurality of "Intelligent" telephone instruments severely impacts the operation of the CO exchange.

Further, the control protocol software used by the "smart" telephone instrument for its operation is usually resident in Read Only Memory (ROM) within a processor complex of the telephone instrument. Any operational changes required to be made to the instrument entailed replacement of the ROM.

It is more advantageous to provide a digital telephone instrument that is basically "less intelligent" that interfaces and communicates to a digital telephone controller resident in the line interface of the CO. In this particular configuration the digital telephone sends requests to the controller, and the controller sends back responses to the digital telephone for controlling its functions. Only those messages required for call processing are transmitted from the controller to the CO central processing complex. All software required in the functional operation of the features of the digital telephone instrument are resident in the controller at the CO site, where the functional operation for each telephone can be changed easily by maintenance technicians without hardware updates.

It therefore becomes the object of the present invention to provide an arrangement and method of proprietary control protocol and messages that are used to control the functional operation of a digital telephone instrument and its call processing system.

SUMMARY OF THE INVENTION

In order to accomplish the object of the present invention there is provided a message interfacing arrangement for a digital telephone system. The digital telephone system includes a Digital Facility Line Card (DFLC) for connecting a user operated Digital Telephone Instrument (DTI) to a stored program operated digital Central Office (CO) system. The message interfacing arrangement of the present invention comprises a DTI message processor arranged to generate and transmit to the DFLC, report messages responsive to user activated DTI events. The DTI message processor is further arranged to receive control messages from the DFLC for instructing the DTI to operate features and to provide the user with visual and aural DTI operating information.

A DFLC message processor is connected to the DTI message processor, and is arranged to generate and transmit to the DTI, control messages for operating the DTI, responsive to received DTI report messages. The DFLC is further connected to a central controller of the CO system. The DFLC message processor generates and transmits to the CO system central controller device report messages requesting access to call processing network services from the CO system, responsive to call processing DTI report messages.

The CO system central controller sends device control messages to the DFLC. The DFLC operates in accordance with the device control messages to generate and transmit to the DTI, DTI control messages, which instruct the DTI to provide the user with operating information and to collect call processing data from the DTI, for transmission to the DFLC message processor as DTI report messages. The DFLC message processor translates the call processing data and generates device report messages, which are transmitted to the CO system.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

The digital telephone of the present invention operates within three distinct interface levels. The Level 1 interface is a physical layer, that is, level 1 is the hardware definition of the linking interface between the Digital Telephone Instrument (DTI) and the Digital Facility Line Card (DFLC) controller.

The Level 2 interface is a transport layer. The Level 2 interface is responsible for maintaining the data link integrity between the digital telephone instrument and its serving DFLC. The level 2 interface is a subset of the Link Access Procedure on the D-channel (LAPD) as defined in the American National Standards Institute (ANSI) Basic Rate Interface specification.

The level 3 interface, also a transport layer, is the control interface of the digital telephone system. The Level 3 interface, the subject of the present invention, is a proprietary set of control and protocol messages that controls all unique functions of the DTI, the reporting of all relevant telephone events and diagnostic capabilities of the DTI.

The Level 1 interface to the DTI is via an Integrated Services Digital Network (ISDN) like standard 2B+D interface. The connection between the DTI and the DFLC controller is a two-wire pair that provides a total of four channels. Two 64 Kbps channels (voice or data), a 16 Kbps channel for control communications between the DTI and the line card controller, and an 8 Kbps auxiliary channel for communications with other devices on the line, (i.e. repeaters) and/or with the DTI.

Figure 1:
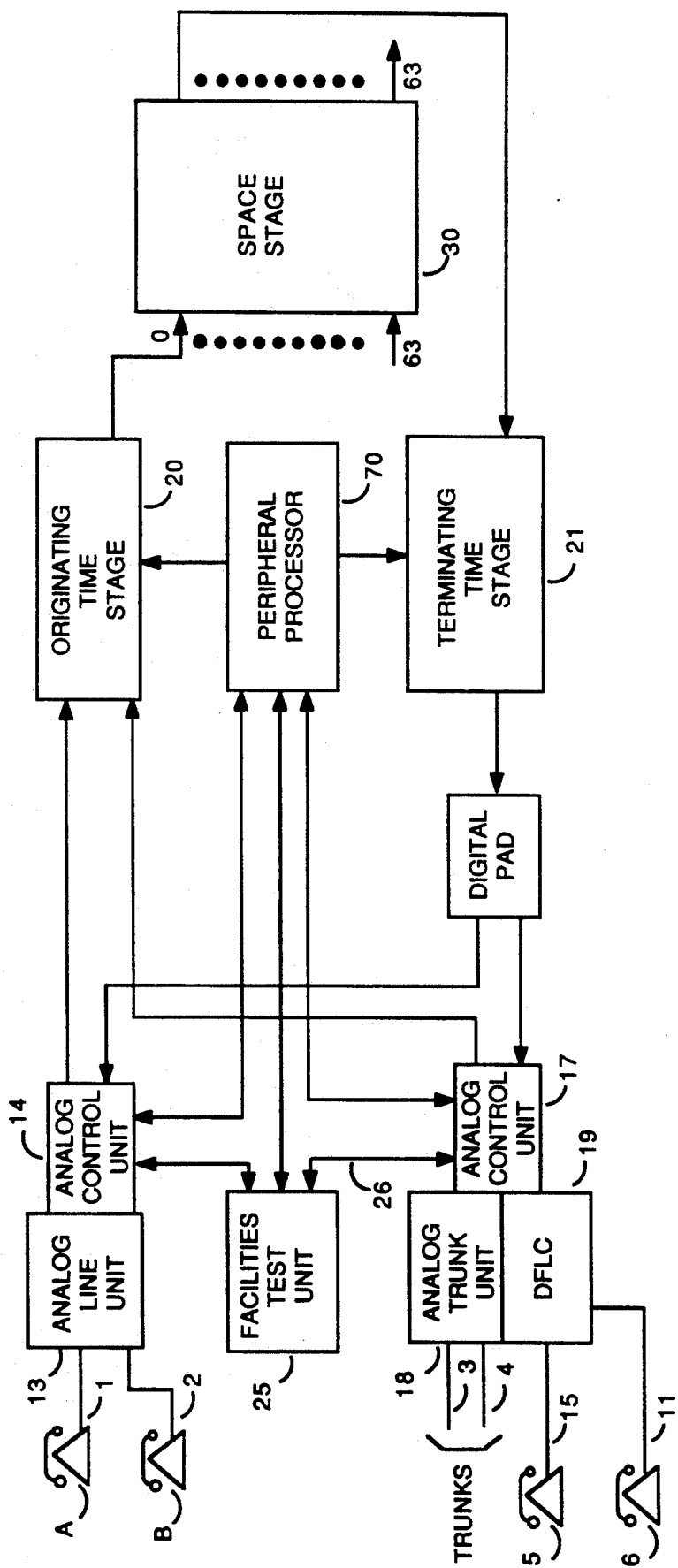
FIG. 1 is a block diagram of a CENTREX network system, embodying the present invention.

Referring to FIG. 1 a central office (CO) system having a central exchange (CENTREX) feature is shown. Standard telephone instruments A and B are connected to the switching system, via analog subscriber lines 1 and 2, to Analog Line Unit 13. The analog data received is converted to Pulse Coded Modulation (PCM) by Analog Line Unit 13. The PCM digital data is next sent from ALU 13 to Originating Time Switch 20. PCM data received from the other end is received by ALU 13 from Terminating Time Switch 21. ALU 13 converts the received PCM data to an analog signal which is transmitted down subscriber lines 1 and 2. ALU 13 is also connected to Analog Control Unit 14, which in turn, is connected to Peripheral Processor (PP) 70.

Terminating Time Switch is further connected to Trunk Unit 18 through Analog Control Unit 17. Trunks 3 and 4 provide access to subscribers not directly served by this system.

The Digital Facilities Line Card (DFLC) 19 is the line card controller used by the present invention. DFLC 19 is connected to analog control unit 17 and provides an interface for up to two DTIs 5 and 6. The primary objective of the DFLC 19 is to appear to Analog Control Unit (ACU) 17 and PP 70 as standard subscriber lines. This objective requires the DFLC 19 to perform a significant amount of the call processing functions associated with the voice transmissions from and to the DTIs 5 and 6, thereby, off-loading these functions from PP 70.

Figure 2:
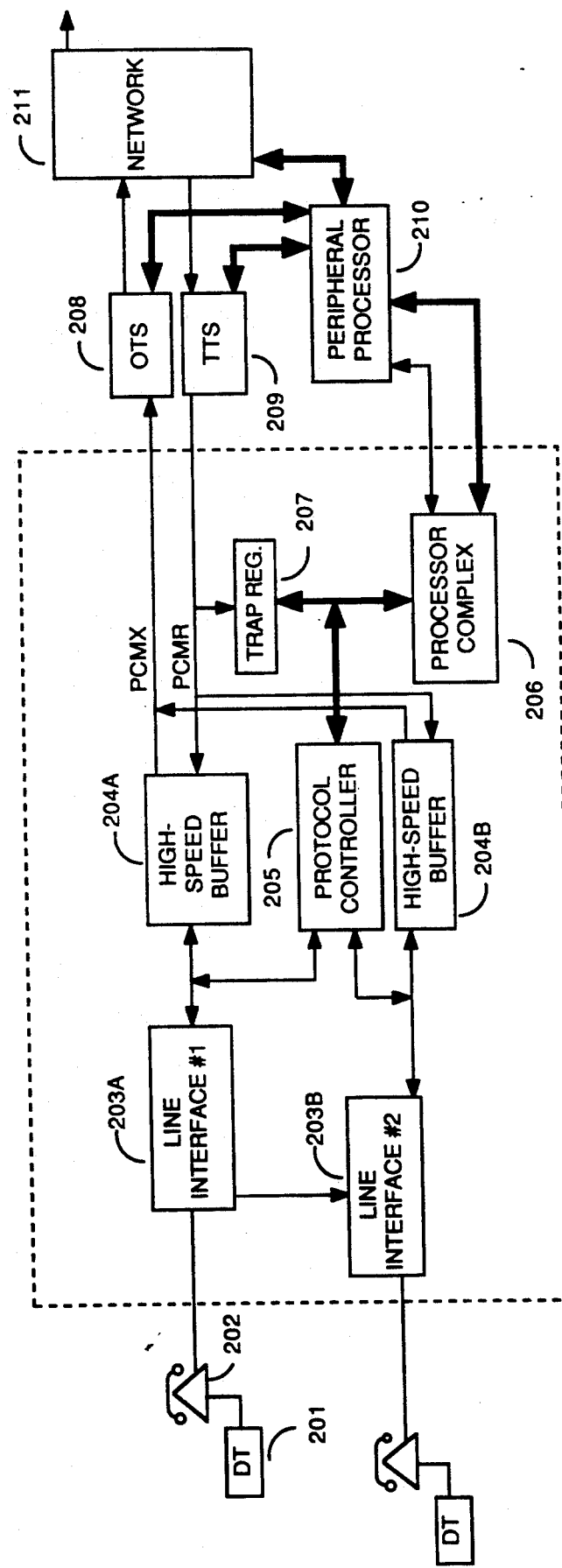
FIG. 2 is a high-level block diagram of the Digital Facilities Line Card, in accordance with the present invention.

Turning now to FIG. 2 a block diagram illustrating the functional components of the DFLC 19 is shown.

The DFLC 19 interfaces to the DTI 202 through a single, two-wire communication link. The two-wire interface provides a high-speed, full duplex digital transmission link using echo-cancelling techniques. As explained earlier, the level 1 interface between the DFLC 19 and the DTI 202 provides four digital channels. Two 64 Kbps channels, one 16 Kbps channel and one 8 Kbps channel. The 64 Kbps channels can be used for PCM voice or high-speed data, the 16 Kbps channel is used to pass control data between DFLC 19 and the DTI, and the 8 Kbps auxiliary channel is used to communicate with other devices on the line, (i.e. repeaters) and/or with the DTI.

The DFLC 19 interfaces to the CO network or system by a PCM interface and a sense/control interface. Data over the PCM interface is transferred to Originating Time Switch (OTS) 208 and received from Terminating Time Switch (TTS) 209. This data is either digitized voice data or circuit switched data and has a data rate of 64 Kbps. (Herein: PCM data means either digitized voice or circuit switched data.)

The DFLC 19 comprises a HIGH-SPEED BUFFER (data interface) 204A that converts the serial data between the different bit rates of LINE INTERFACE 203A, and OTS 208. In addition, HIGH-SPEED BUFFER (data interface) 204A provide a time switch stage. TRAP REGISTER 207 is used to perform diagnostic testing and downloading of information. (These functions are described in more detail in co-applications "A Circuit For Testing Digital Lines," Ser. No. 07/615,529 filed on Nov. 19, 1990 and "A Method Of Downloading Data To A Plurality Of Destinations In A Digital Telephone System," Ser. No. 07/615,522 filed on Nov. 19, 1990.

Through the sense/control interface, PP 210 communicates with DFLC processor 206, which in turn communicates to DTI 202. Device control and report messages between the DFLC and the CO system are passed through this interface. The sense/control interface consists of eight data lines, four address lines, and associated control lines.

When PP 210 sends a control message to the DFLC, it writes the message into the DFLC's input buffer, then sets a SYS-DFLC flag on the DFLC. The DFLC, upon receiving the SYS-DFLC flag, reads the message and resets the flag, indicating to PP 210 that it is ready for another message. Conversely, when the DFLC sends a report message to PP 210, it writes the message into its output buffer and sets a DFLC-SYS flag. When PP 210 sees the DFLC-SYS bit set it reads the message from the DFLC and resets the DFLC-SYS flag.

PROTOCOL CONTROLLER 205 handles the "bit-level" protocol conversion thereby providing a very reliable data link between the DFLC and the DTI 202.

LINE INTERFACES 203A and 203B convert the digital data into appropriate signals for transmission over a twisted-pair line. The signals from the LINE INTERFACES 203A and 203B are transmitted to the DTIs 202, where an identical LINE INTERFACE receives the signal and reconstructs the digital data.

Figure 3:
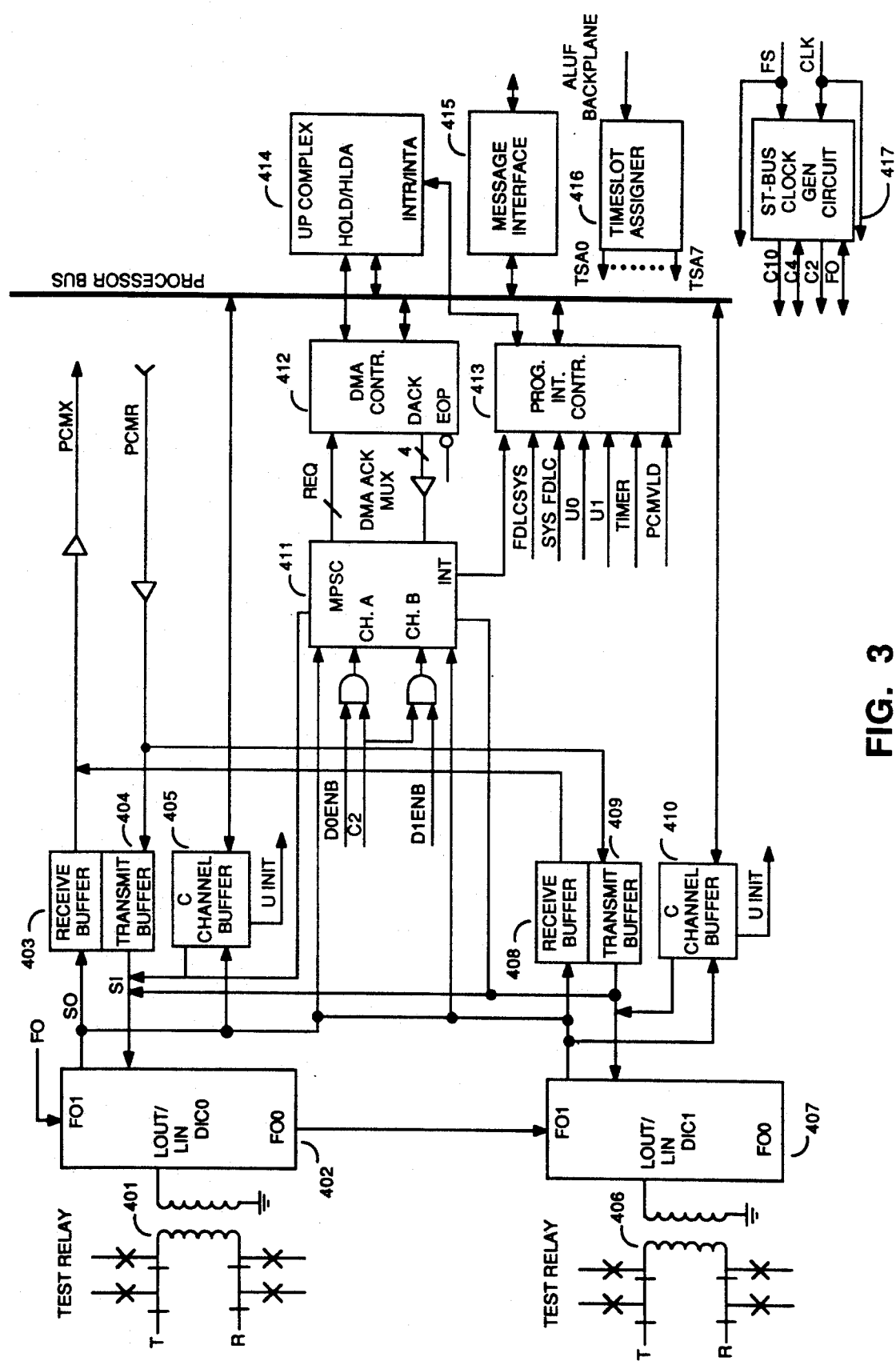
FIG. 3 is a low-level block diagram of the Digital Facilities Line Card, in accordance with the present invention.
Figure 4:
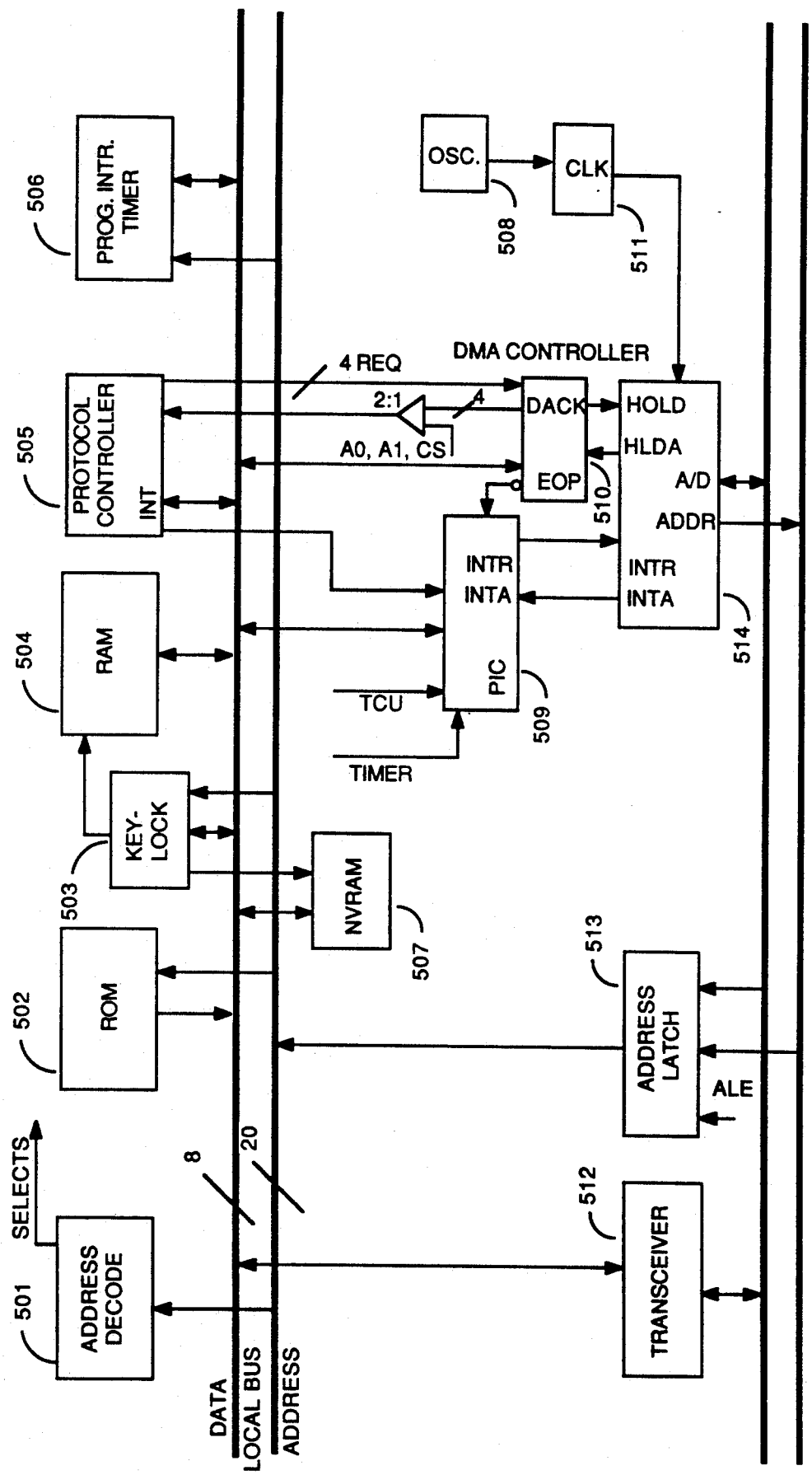
FIG. 4 is a block diagram of the Digital Facilities Line Card's microprocessor complex, in accordance with the present invention.

Referring now to FIGS. 3 and 4 a more detailed description of the DFLC will be given. TRANSFORMER 401 and Digital Interface Chip (DIC) 402 implement LINE INTERFACE 203A and TRANSFORMER 406 and Digital Interface Chip (DIC) 407 implement LINE INTERFACE 203B shown on FIG. 3. The DICs provide an interface between the line (Tip-and-Ring) on one side, and a Time Division Multiplexed (TDM) serial data-stream on the other. Each DIC uses four TDM time-slots; two channels for the high-speed data, one channel for the link with the DTI, and an auxiliary channel for control and status of the DIC itself. Note: The auxiliary channel is part of the control/status channel. After DIC 402 finishes accessing the TDM data stream, DIC 407 is signaled, allowing DIC 407 access to the TDM data stream during the next four time-slots. With the present implementation, a total of eight DICs can be daisy-chained onto the same bus.

RECEIVE and TRANSMIT BUFFERS 403, 408 and 404, 409 respectively, convert the bit-rate between the CO system (PCMX and PCMR) and the DICs while preserving the overall data-rate of the channel. All four buffers are under control of TIMESLOT ASSIGNER 416 and CLOCK-GENERATOR 417. TIMESLOT ASSIGNER 416 is programmed by the external PERIPHERAL PROCESSOR 210, and determines the time slots for each high-speed channel on the PCMX and PCMR busses. CLOCK-GENERATOR 417 produces all the timing signals needed by DICs and is phased locked to a master clock signal provided by the CO system. Under the control of CLOCK-GENERATOR 417, the buffers are enabled, during the proper time-slot, to receive and transmit serial data from the DICs.

Figure 5:
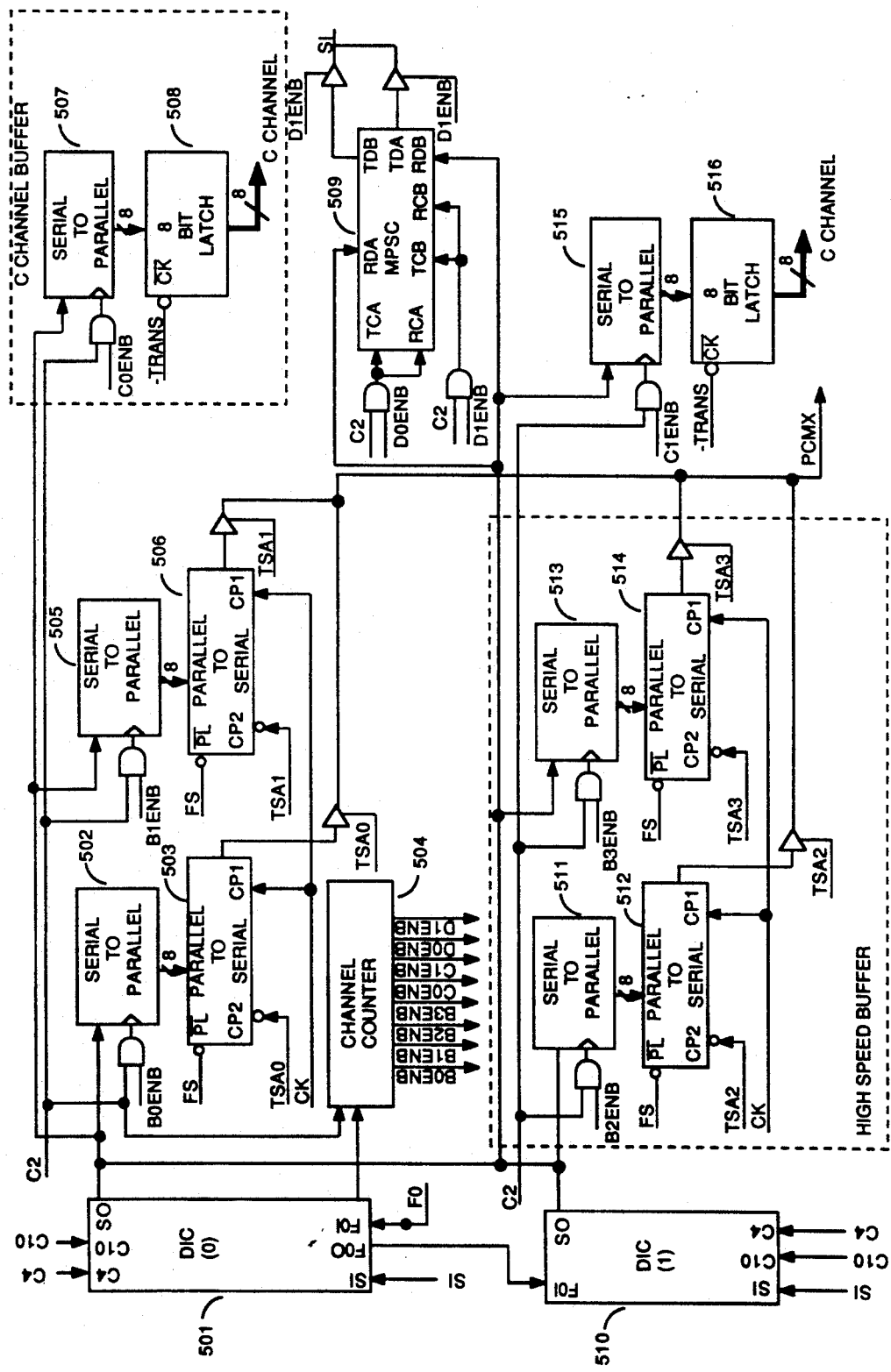
FIG. 5 is a block diagram of the Receive Buffer of the Digital Facilities Line Card, in accordance with the present invention.
Figure 6:
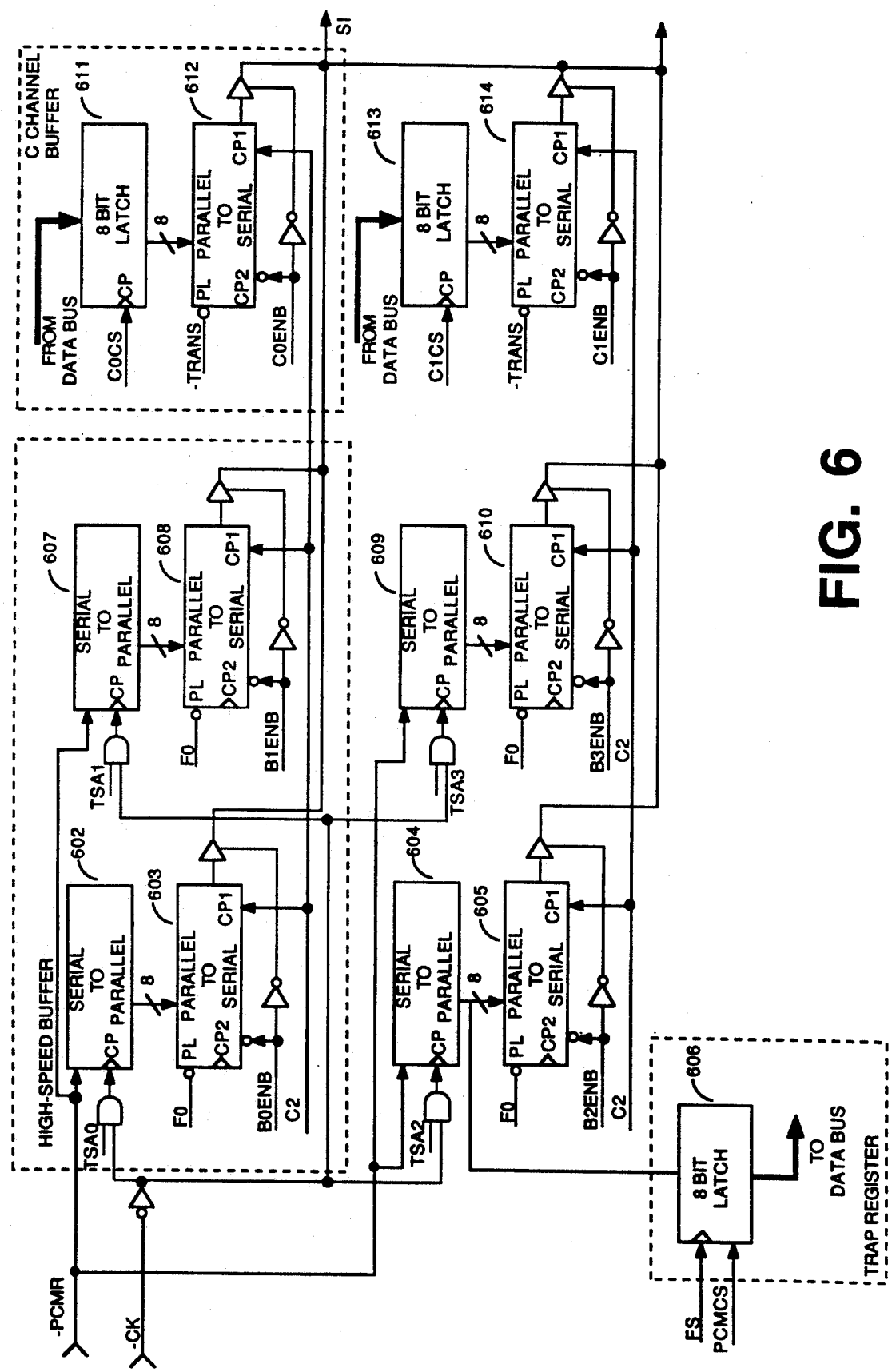
FIG. 6 is block diagram of the Transmit Buffer of the Digital Facilities Line Card, in accordance with the present invention.

Briefly referring to FIGS. 5 and 6 the RECEIVE and TRANSMIT BUFFERS are shown in greater detail. These figures show that the HIGH-SPEED BUFFERS are comprised of serial-to-parallel-to-serial converters, or just serial-to-serial converters.

Referring back to FIG. 3, CLOCK-GENERATOR 417 also provides timing for C Channel Buffers 405 and 410 and Multi-Protocol Serial Controller (MPSC) 411. The C CHANNEL BUFFERS provide an interface between PROCESSOR COMPLEX 414 and DICs 402 and 407. Through this link, PROCESSOR COMPLEX 414 can control certain internal functions of the DICs and monitor internal status. Additionally, the C Channel Buffers convert the data between the parallel format of PROCESSOR COMPLEX 414 and the serial format of DICs 402 and 407. The C Channel Buffers allow the PROCESSOR COMPLEX 414 to operate asynchronously to the DICs. The C Channel Buffer, as used in the present invention, is taught by U.S. Pat. No. 4,975,911, titled, "An Interface For Data Transmission Between A Microprocessor System And A Time-Division-Multiplexed System," issued Dec. 4, 1990, and having a common assignee with the present invention. It should be noted that the auxiliary channel used to communicate with other devices on the line (i.e. repeaters), is transferred by the C Channel Buffers.

MPSC 411 provides the bit-level 2 interface protocol functions. These functions maintain the sequence order of frames across the data link connection, detection of transmission, format and operational error detection on the data link, and notification to the managing entity of unrecoverable errors. All level 3 messages sent to and from the DFLC and the DTI require a level 2 acknowledgement from the receiving entity. Because of the relatively high data rate of this channel, 16 Kbps×2 (one for each DTI), DMA controller 412 interfaces MPSC 411 to PROCESSOR COMPLEX 414. This allows data to be transferred between the MPSC and the PROCESSOR COMPLEX with very little overhead.

PROCESSOR COMPLEX 414 interfaces to the CO system through MESSAGE INTERFACE 415. Through this interface, the CO system passes device control messages to the DFLC, upon which, the DFLC performs all the low-level computing and communications with the DTI.

FIG. 4 shows PROCESSOR COMPLEX 414 in more detail. The PROCESSOR COMPLEX 414 includes an engineerable amount of Non-volatile RAM 504 for storing of customer information. Customer information is downloadable data which represents customized features which operate the connected DTIs in a specific manner. Also, there is a RAM KEY LOCK 503 which allows MICROPROCESSOR 514 to "write-protect" Non-volatile RAM NVRAM 507 and RAM 504 in 1K byte pages.

Figure 7:
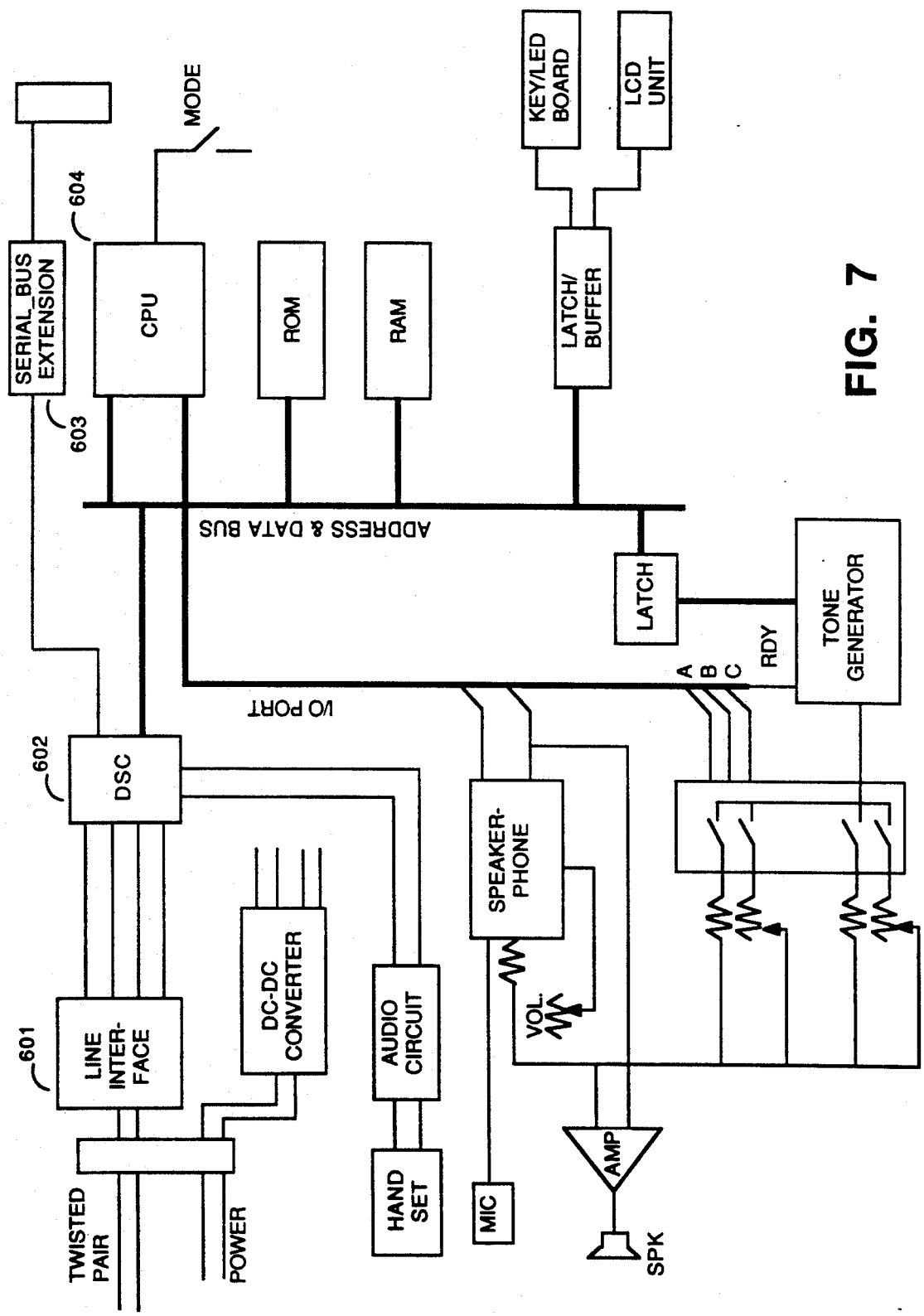
FIG. 7 is a block diagram of a Digital Telephone Instrument used with the present invention.

Referring to FIG. 7 a block diagram of the DTI is shown. The signal from the DFLC is received by LINE INTERFACE 601. LINE INTERFACE 601 is identical to the line interface on the DFLC with the exception that it operates in a slave mode. In the slave mode, all timing is derived from the two-wire line, whereas in the master mode, all timing signals must be externally derived and supplied to the line interface. The Digital Subscriber Controller (DSC) 602 provides bit-level protocol control and channel separation. CPU 604 provides the higher level protocol control, in addition to controlling other functions for the DTI. The DTI does not perform any call processing functions, it simply reports events (buttons being pushed, off-hook ... etc.) to the DFLC and performs actions that the DFLC has commanded (blink LED, display message, enable amp . . . etc.). These messages are part of the Level 3 interface.

Unlike a POTS (Plain Old Telephone Service) line, the link between the DFLC and DTI is always active. Instead of the line card detecting an "off-hook" condition, the DTI detects the "off-hook" and sends the appropriate Level 3 message to the DFLC.

Figure 8:
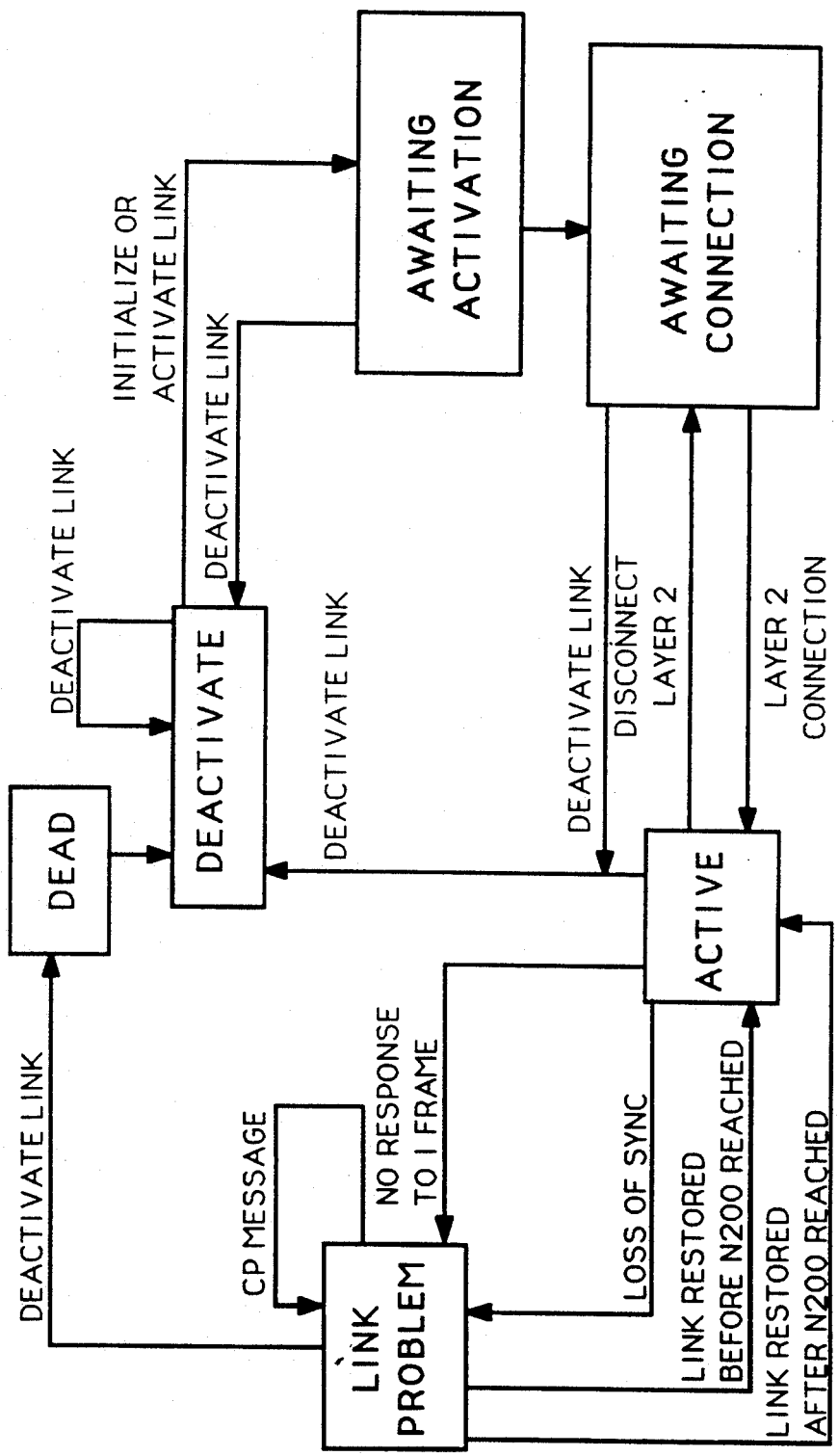
FIG. 8 is a state diagram showing the states of activation for the Digital Facilities Line Card, in accordance with the present invention.

Referring now to FIG. 8, when the link between the DTI and the DFLC is first activated or initialized, the various levels of the link must be connected. When the link is first powered-up (Level 1), or after testing of the link, the link is in the DEAD state. After performing initialization of the DFLC, the DEACTIVATE state is automatically entered. The link will stay in this state until the DFLC receives an INITIALIZE or ACTIVATE LINK (level 2) message from the CO system.

After receiving an INITIALIZE or ACTIVATE LINK message the AWAITING ACTIVATION state is entered. During this time the line interface circuit is activated and time is allowed for the DFLC line interface and the DTI interface to synchronize. If, after a predetermined amount of time has passed, the line interfaces do not synchronize, the DFLC returns to the DEACTIVATE state, and a failure message is sent to the CO system.

After the line interfaces synchronize, the AWAITING CONNECTION state is entered. During this time the level 2 MPSC 411 protocol controller of the DFLC and the DTI are allowed to synchronize. If, after a predetermined amount of time has passed, the protocol controllers do not synchronize, the DFLC returns to the DEACTIVATE state, and a failure message is sent to the CO system.

Once the protocol controllers synchronize, the DFLC enters the ACTIVE state. In this state, the DFLC's processor complex and the DTI's processor can exchange level 3 messages and calls can be originated and terminated. The ACTIVE state can be exited by: (1) A Level 3 message from the CO system to deactivate; (2) The Protocol Controller losing synchronization; (3) The Line Interface losing synchronization; or (4) The DTI not responding.

A DEACTIVATE message from the CO system causes the DFLC to change to the DEACTIVATE state. Should the protocol Controller lose synchronization, the AWAITING CONNECTION state is entered.

If the line interface loses synchronization or the DTI does not respond, the LINK PROBLEM state is entered. Here, there is an attempt to restore the link; if the link is restored prior to the timer N200 expiring, the ACTIVE state is reentered, and a report is sent to the CO system. This type of outage is generally caused by a "glitch" on the line, and is short in duration so that the protocol controllers do not lose synchronization. If the link is not restored prior to timer N200 expiring but before a predetermined time, the ACTIVE state is reentered, and a report is sent to the CO system. It may be necessary to enter the AWAITING CONNECTION state because the protocol controllers may have lost synchronization. If, after a predetermined amount of time, the link is not restored, the DEACTIVATE state is entered and an error report is sent to the CO system.

As stated earlier, once in the ACTIVE state, the DFLC's processor complex and the DTI's processor can exchange messages and calls can be originated and terminated.

The DTI communicates with the DFLC via level 3 messages. The messages can be grouped into two major categories: control messages, which are level 3 messages sent by the DFLC to the DTI and Report messages, which are level 3 messages sent by the DTI to the DFLC. Control messages instruct the DTI to perform a task. Report messages instruct the DFLC that an event has occurred. Both categories of level 4 messages are further organized into three functional groups:

Programming Messages—used to program default information into the DTI, where it will be retained for later use;

Call Processing Messages—used to perform call processing feature operation functions;

Maintenance Messages—used to perform maintenance related operations such as diagnostics; and General Messages—used to communicate information that does not fall into the category of programming, call processing, or maintenance.

The Level 3 messages between the DFLC and the DTI are arranged into the following format:

```
Level 2 (X.25) Header
OOH (Q.931 "Escape" code)
voice/data[xx] Message Length
Control/Report message type
    variant message data for
              .
              .
              .
       certain message types
         level 2 frame check
         level 2 frame check
```

The center block represents the Level 3 portion of the message. For example, AUDIO is a control message sent by the DFLC to the DTI that establishes a connection to the voice/data channel. Audio may be turned off, routed to the handset or speaker of the DTI. The audio level is set to the level indicated in the message.

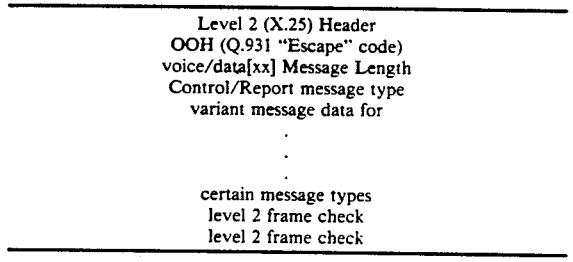

The Level 3 portion of the AUDIO control message is shown above. The first byte field identifies the type of message. The second byte field passes additional data required by the message type. In this example, field A would contain a two bit field identifying the audio mode the DTI should operate; i.e. 0=off, 1=handset, 2=speaker, etc. The 4 bit B field passes audio level information to the DTI; i.e. 0=+18 dB, 15=−10 dB.

Communication between the DFLC and the CO system is performed via message transfer through a memory mapped sense/control interface. These messages are grouped into Device Control messages and Device Report messages. They are also further classed into call processing, maintenance and control. These messages are organized and structured to be compatible with the message structures used by the CO system. One such example would be the format shown below.

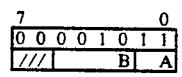

-continued

```
      device_type
   dc(dr)_message_type
      line number
   variant message data for certain message types
```

A = Message class (call processing, maintenance, control).
B = Response class (default, call processing, maintenance, none).
C = Service (voice, data).
D = Circuit
E = Message Source/Destination (connected device, line card).

The dc(dr).message.type is the type of message that is being sent: dc = device control, dr = device report.

As in the level 3 messages between the DFLC and DTI these messages often require amplifying data or variant information. This variant data is contained in the last two data fields of the message.

The device control message FP.Request.Ringing (FP = message specific to the DTI device), sent from the CO system to a called DTI includes additional data fields that define call.type (voice/data), and ring.format (type of ringing to apply).

Figure 9:
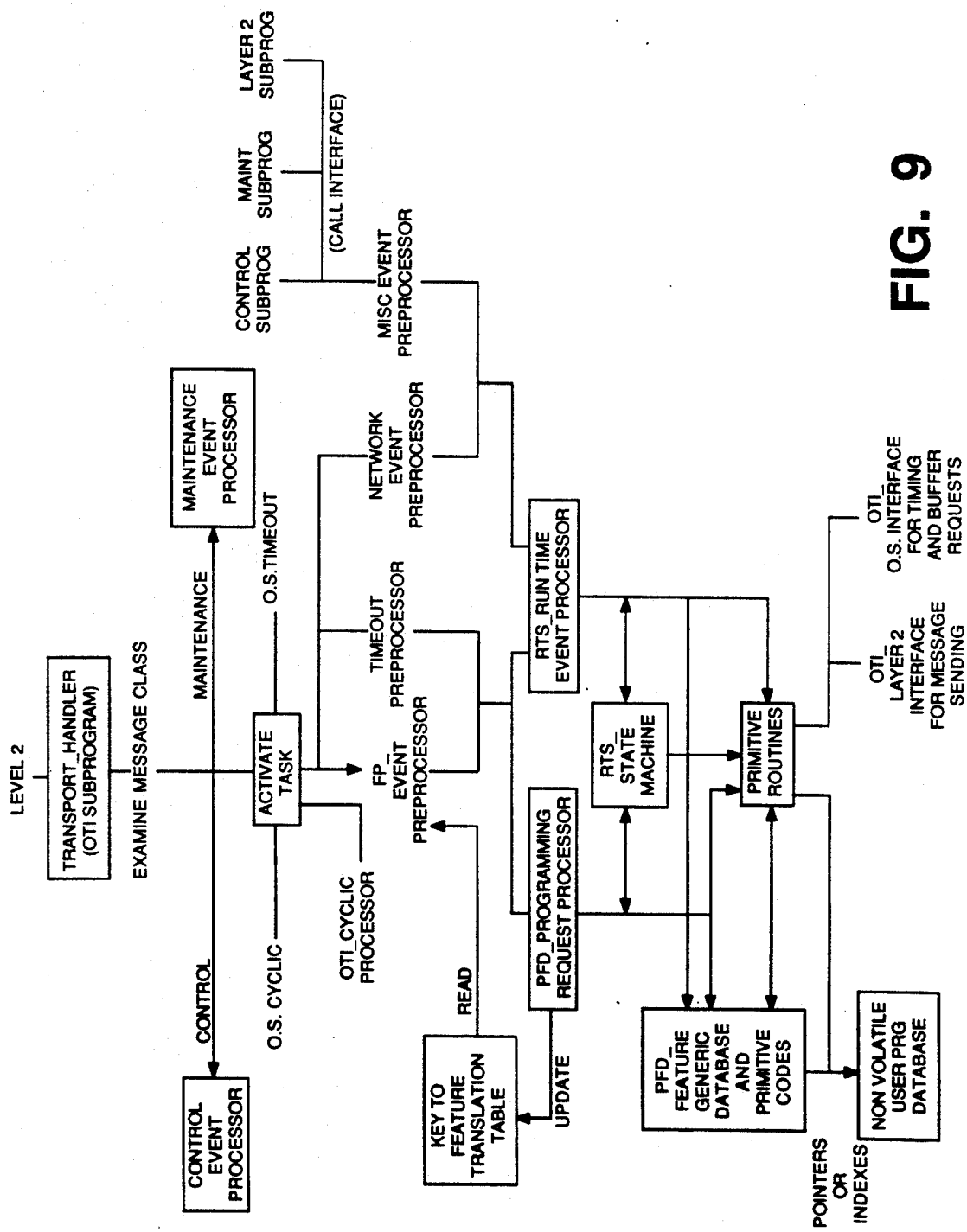
FIG. 9 is a diagram showing the system level architecture of the software, comprising call processing and support functions, in accordance with the present invention.

All DTI events, such as a key depression or a hookswitch event are passed to the DFLC as a level 3 report message. The DFLC interprets the function of the event and generates the appropriate control message to the DTI and device report message to the CO system. The DFLC also sends to the DTI control messages based on a particular event, based on the DFLC's knowledge of the call state and the control message received from the CO system. As can be appreciated, the DFLC unloads the potential real-time burden of directly controlling the DTI from the CO system central controller. Turning now to FIG. 9, a diagram of the system level architecture of the software, comprising call processing and support functions of the DFLC is shown. The CO system software is organized into three subprogram groups the OTI—Operating System and Transport Interface, including cyclic functions; the PFD.Programming and Feature Data base; and, the RTS. - Run Time Event and State Machine, including preprocessors.

Additionally, an Operating System subprogram (OS) which resides as RAM-based firmware on the DFLC provides the functions necessary to integrate the functional tasks of the DFLC system under a common supervisory program. This controls the systems scheduling and execution of tasks.

The OTI subprogram provides the message interface between the CO system, the DTI, and the other subprograms located within the DFLC. It also provides a "macro-level" interface with the subprograms and the associated "micro-level" interface with the OS. The OTI subprogram performs the following functions:

The OTI includes a level 3 message handler/interface from the transport handler, providing handling of level 3 messages to/from the DFLC and the CO system via the sense and control interface. Handling of level 3 messages to/from DFLC and the DTI via buffers passed to/from the level 2 LAPD functions. Additionally, the level 3 message handler function of the OTI acts as a message distributor. It either activates a Call Processing, Control or Maintenance task or directly calls a module within the Call Processing, Control or Maintenance subprograms for processing the level 3 messages. The OTI subprograms provide an interface between the other subprograms in the system and the OS. The number of tasks, their priority, their period (if cyclic), and any inter-task communication capabilities if required. A mechanism is provided (supported by the OS) to allow flexible timers (including the ability to pass data and time-out handler identity). A task delay mechanism and a expect message or time-out mechanism to awaken the task is also provided by this subprogram. The OTI uses the message.class field of the level 3 message to distribute control to either the call processing, control or maintenance message handlers.

The PFD subprograming is comprised of the "Feature Generic Data Base", the "Programing Request Processor", and any primitive routines that are related to programing. The PFD subprograming processes all level 3 Programing messages sent to the DFLC from the DTI. The data base is required to instruct the DFLC software to sequence through the programing for the various features. This data base consists of FP (DTI related) control sequences, i.e. send display messages, light LEDs, etc.

The data base structure and contents are defined by a specification language defined as the Feature Key Programing Language (FPKL). The FPKL contents include all feature names and associated feature numbers including display information details such as first line, second line, start column displays, whether to blank the display before displacing the string, string length, and string attributes. Key programming information on a per feature basis, valid key codes or key groupings, codes for unexpected input keys, and hook status information and associated menu prompts.

The RTS subprogram includes the functions of the "Run Time Event Processor", the "State Machine", all of the "preprocessors", and any primitive routines that are related to run time event handling. The RTS subprogram is the primary "engine" which processes Level 3 call processing control and report messages.

Figure 10:
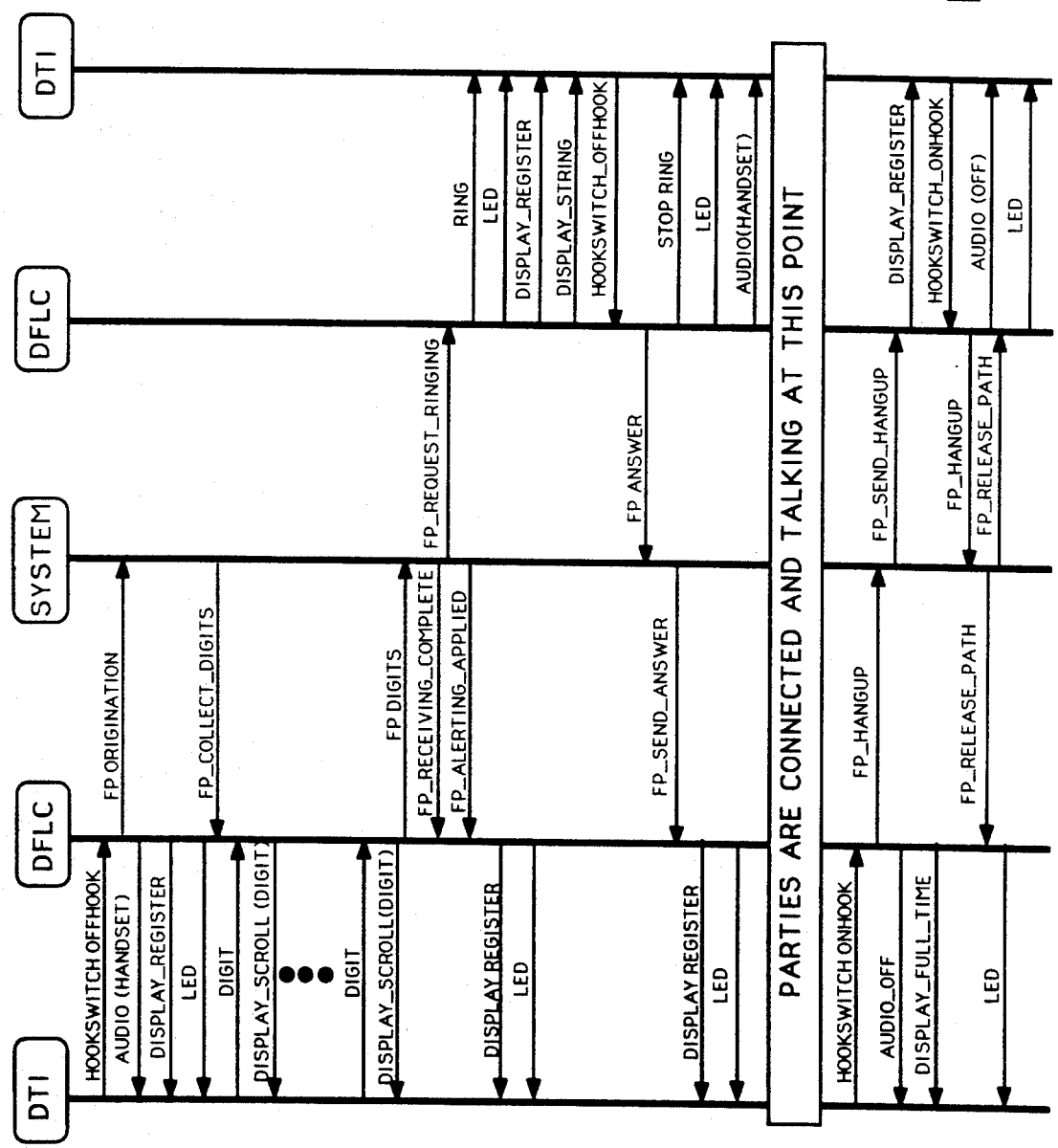
FIG. 10 is a message flow diagram showing the messages passed between the system, the Digital Facilities Line Card and the Digital Telephone Instrument during call processing, in accordance with the present invention.

With reference to FIGS. 9 and 10, a better understanding of the manner in which the RTS subprogram handles call processing messages can be obtained. The following example will list the messages and steps required to call a terminating or called DTI from an originating or calling DTI.

SEIZURE

With both the originating and terminating DTIs in an idle state, the OTI of the originating DTI will be called from Level 2 when a "hookswitch off-hook" message arrives to its associated DFLC. The OTI will activate a task (FP event preprocessor) in the RTS subprogram. The FP event preprocessor will determine if the event is a programing request, and if so, pass control to the PFD subprograming request processor. If the event is a preprogramed function key feature, the key function is determined by looking up the key function in the feature translation table and then passing control to the RTS.RUN TIME event processor. If the event is a hookswitch off-hook, then control is passed to the RTS. RUN TIME event processor (this is the normal expected event during a seizure sequence). The RTS. RUN TIME event processor will determine what action is required. For example, if the event is a feature key or a line key, the actions required of the function key is looked-up in the PFD.Feature Generic Data Base and the NON VOLATILE USER PRG. DATA BASE.

When the RTS.RUN TIME event processor determines that a call is being initiated, an LED control message is sent to the DTI to light the selected line LED, associated with the line key. The RTS.state machine at this time is still in an idle state. However, a substate.line.status message is sent to the DTI, indicating off-hook was received.

The RTS.RUN TIME event processor sends a device report message, FP.Origination, to the CO system requesting service. The DFLC will then send an Audio control message to the DTI for mode=handset (if not already in the handset mode). The RTS.state machine now transfers to a Call.Initiated state. A start response timer is initiated which begins to countdown. If the timer times out with the state machine status in Call. Initiated before a Request.Denied or a Collect.Digits message is received from the CO system then a problem exists with the DFLC/CO system interface and an appropriate message such as "Cannot Complete" is sent and displayed on the DTI. If an on-hook message is received then a FP.Hangup message is sent to the CO system indicating cancelling of the last origination request.

SYSTEM PROCESSING

The CO system will select a path through the network to the terminating DTI. If the CO system cannot process the origination due to throttling, concentrator blockage, etc. then a Request.Denied message is sent to the DFLC. If a path is established through the network to the terminating DTI then the message FP.Collect. Digits is sent to the DFLC. This is the message normally expected by the DFLC in response to its FP. Origination message.

DIALING

Upon receipt of the FP.Collect.Digits message the originating DTI will receive dial tone on the handset. A Display.Register message will be sent from the DFLC to the DTI which displays the message "please dial". The DFLC will also send an Enable.DTMF message to the DTI enabling the DTMF transmitter. The RTS. state machine is now transferred to the Collecting. Digits state. If the originating DTI user has already entered digits before the FP.Collect.Digits message is received from the CO system, then the buffered digits will all be sent to the CO system at once. In the normal case, when the DTI user enters the first dialing digit, the DFLC will clear the DTI display and send a Display.Scroll message to the DTI with the ASCII value of the digit. Simultaneously, an FP.Digits device report message is sent to the CO system with the value of the dialed digit. The dial tone is removed by the CO system upon receipt of the first digit message.

As the DTI user enters digits, the display will be updated using the Display.Scroll message. The dialed digit values will be collected by the DFLC and transmitted to the CO system network by responding with FP.Digits device report messages to a sequence of FP. Collect.Digits device control messages from the CO system.

DIGIT COLLECTION COMPLETE

When the CO system receives all the digits required to establish connection to the terminating DTI the CO system will send to the originating DFLC an FP. Receiving.Complete message. This message alerts the originating DFLC to stop collecting digits. The RTS. state machine then transfers to the awaiting.destination. answer state.

ALERTING

After the CO system translates the digits received from the originating DTI the CO system sends an FP. Request.Ringing message to the terminating DFLC. The FP.Request.Ringing message received by the terminating DFLC includes data that specifies the type of ringing to be applied, i.e. distinctive, etc., and if the originating DTI number is displayed (call numbers from outside the basic business group are not displayed and a message "incoming call" is displayed instead. The DFLC will then look up via the PFD.FEATURE GENERIC DATA BASE the terminating DTI's programmed alerting method, ringing frequency and display choices. The terminating DFLC then sends to the terminating DTI the appropriate ring, LED, Display. Register, and Display.String (if the calling number is displayed) messages. The RTS.state machine of the terminating DFLC switches from an idle state to an awaiting.local.answer state, (awaiting the hookswitch to go "off-hook"). The CO system then sends to the originating DFLC an FP.Alerting.Applied message. The originating DFLC then sends to the originating DTI an LED and Diplay.Register message that displays "Ringing" or "Calling" (in case of a trunk with no supervision).

ANSWER

When the terminating DTI user lifts the handset to answer the call, the terminating DTI sends the report message Hookswitch.Off-hook to its DFLC. The DFLC then sends FP.Answer to the CO system. The RTS.state machine goes into the active mode. Simultaneously, the terminating DFLC sends to the terminating DTI the messages Stop.Ring (to stop the ringing), LED (turn on the in-use LED), and AUDIO (turn on the handset audio).

Once the CO system receives the FP.Answer message, it sends FP.Send.Answer to the originating DFLC. The RTS.state machine, of the originating DFLC, switches to the active state. The DFLC then sends an LED and a Display.Register message to display the message "Answer". Both parties are now connected and talking and no further call processing is done until one party hangs up.

RELEASE

Either the originating or terminating DTI can terminate the call but in this embodiment a release of the originating DTI will be discused. It should be understood that the sequence of steps in the release procedure is the same as if the terminating DTI initiated the release.

When the originating DTI user replaces the handset or activates a cancel call key, a Hookswitch.On-hook report message is generated and sent to the originating DFLC. The DFLC will immediately begin flash timing. If the on-hook condition persists for more than 1.2 seconds then the originating DFLC will report FP.Hangup to the CO system. During the flash timing the RTS state machine will change to awaiting hangup. After the 1.2 second time out the state will change to awaiting destination disconnect and the display will be blanked. The DFLC then sends Audio.Off and Display.Full.Time to the DTI. This removes the audio from the handset and displays the normal time and date display. Full release of the originating DTI does not occur until the CO system sends to the originating DFLC an FP.Release. Path message following at some time after the CO system process the FP.Hangup message. If the originating DTI is still on-hook when the FP.Release.Path message arrives then the RTS. state machine returns to idle and a LED message is sent to the DTI turning off the line active LED.

Upon receipt of FP.Hangup from the releasing party's DFLC the CO system sends FP.Send.Hangup to the released party's DFLC. The DFLC then sends a Display.Register message informing the user of hangup of the calling party. Upon the hangup of the terminating DTI a Hookswitch.On-hook message is sent to the DFLC and flash timing is started. The RTS. state machine status goes to awaiting.destination.disconnect from active. The DFLC sends to the CO system FP. Hangup and to the DTI Audio.Off after 1.2 seconds have elapsed. After the CO system process the FP. Hangup an FP.Release.Path message is sent to the terminating DFLC. The RTS. state machine returns to idle and an LED message is sent to the terminating DTI turning off the line active LED.

As explained above and shown on FIG. 10 it is apparent that the DFLC does a substantial amount of call processing and the DTI is relatively a "dumb" instrument. This allows the DTI to be less complex, leading to higher reliability, smaller size, lower power, and lower cost.

All the DTI keys except for the dialing key pad digits are programmable by the user. Once the user initiates the programming sequence, a series of menus are displayed to aid the programming process. The entire programming process is handled by the DFLC, the CO system does not participate. Programming information is stored in the nonvolatile RAM of the DFLC. Should the DFLC need to be replaced, the CO system retrieves the information from the present DFLC prior to removal. After the new DFLC is placed into the CO system, the CO system down-loads the customers information. It should be noted that only during a DFLC card replacement is the customers database ever loaded into the CO system.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A message interfacing arrangement for a digital telephone system, said digital telephone system including a Digital Facility Line Card (DFLC) for connecting a Digital Telephone Instrument (DTI) to a Central Office (CO) system, said message interfacing arrangement comprising:

a DTI message processor arranged to generate and transmit to said DFLC, DTI report messages, responsive to user activated DTI events, and said DTI message processor further arranged to receive DTI control messages from said DFLC for instructing said DTI to operate features, and to provide a user with visual and aural DTI operating information;

a DFLC message processor connected to said DTI message processor, arranged to generate and transmit to said DTI message processor, said DTI control messages, for operating said DTI responsive to said DTI report messages, and said DFLC further connected to a central controller of said CO system, said DFLC message processor arranged to generate and transmit to said CO system central controller device report messages, requesting access to, and network services from said CO system, responsive to said DTI report messages; and said CO system central controller arranged to send device control messages to said DFLC, whereby said DFLC operates in accordance with said device control messages to generate and send said DTI control messages to said DTI, and collect data from said DTI for transmission to said CO system.

2. A message interface arrangement as claimed in claim 1, wherein said DFLC message processor includes a transport handler that examines and classifies said DTI report messages and said device control messages, and said transport handler is arranged to pass said DTI report messages and said device control messages that involve call processing events to a DFLC call processing event processor.

3. A message interface arrangement as claimed in claim 2, wherein said DFLC call processing event processor includes:

an event preprocessor arranged to determine if said call processing event from said transport handler is a preprogrammed feature, whereby, said even preprocessor determines the function of said preprogrammed feature in a feature translation table and passes event information on for further processing;

an event processor arranged to receive said event information from said event proprocessor and unprogrammed call processing events and generate said DTI control messages and said device report messages in response to said call processing events and said event information;

a state machine arranged to receive said DTI control information from said event processor that correspond to received call processing events, said state machine arranged to change into specific operational states responsive to said received call processing events;

a programming request processor arranged to receive programmed call processing events and determine appropriate call processing responses to said received programmed call processing events and to pass said call processing responses to said event processor; and a feature generic database arranged to be accessed by said programming requires processor, whereby, said appropriate call processing responses are derived in response to programmed call processing events.

4. A message interfacing arrangement for a digital telephone system, said digital telephone system including a Digital Facility Line Card (DFLC) for connecting a Digital Telephone Instrument (DTI) to a Central Office (CO) system, said message interfacing arrangement comprising:

a DFLC message processor arranged to generate and transmit to said DTI, DTI control messages, for operating DTI features, and to provide a user with visual and aural DTI operating information, in response to DTI report messages transmitted by said DTI following a user activated DTI event, said DFLC message processor further arranged to generate and transmit to said CO system device report messages requesting access to, and network services from, said CO system, and said CO system central controller arranged to send device control messages to said DFLC, whereby, said DFLC operates in accordance with said device control messages to generate and send said DTI control messages to said DTI, and collect data from said DTI for transmission to said CO system.

5. A method for interfacing a digital telephone system, including a Digital Facility Line Card (DFLC) having a message processor for handling control messages between a Digital Telephone Instrument (DTI) and a Central Office (CO) system, said method comprising the steps of:

sending DTI report messages to said DFLC message processor following user activated DTI events;

interpreting said DTI report messages by said DFLC message processor in accordance with specific data base stored instructions, and transmitting DTI control messages to said DTI for executing responses to said user activated DTI events, providing said user with visual and aural DTI operating information;

said DFLC message processor, generating and transmitting to said CO system device report messages requesting access to, and network services from said CO system, responsive to said DTI report messages; and receiving and interpreting device control messages transmitted to said DFLC message processor from said CO system, requesting said DFLC message processor to generate and transmit to said DTI, said DTI control messages, which instruct said DTI to provide said user with operating information and to collect call processing data from said DTI for transmission to said DFLC message processor as said DTI report messages; and said DFLC message processor translating said call processing data and generating said device report messages, thereby, transmitting said call processing data to said CO system.

* * * * *